United States Patent
Otto et al.

(10) Patent No.: US 10,889,192 B2
(45) Date of Patent: Jan. 12, 2021

(54) APPARATUS AND METHOD FOR PROVIDING ELECTRICAL ENERGY IN A VEHICLE

(71) Applicant: JENOPTIK Advanced Systems GmbH, Wedel (DE)

(72) Inventors: Stephan Otto, Hamburg (DE); Daniel Koenig, Hamburg (DE)

(73) Assignee: Jenoptik Advanced Systems GmbH, Wedel (DE)

( * ) Notice: Subject to any disclaimer, the term of this patent is extended or adjusted under 35 U.S.C. 154(b) by 11 days.

(21) Appl. No.: 16/201,263

(22) Filed: Nov. 27, 2018

(65) Prior Publication Data

US 2019/0160969 A1    May 30, 2019

(30) Foreign Application Priority Data

Nov. 27, 2017 (DE) ........................ 10 2017 221 135

(51) Int. Cl.
*B60L 50/60* (2019.01)
*B60L 53/62* (2019.01)
(Continued)

(52) U.S. Cl.
CPC ............... *B60L 50/66* (2019.02); *B60L 53/62* (2019.02); *B60L 58/20* (2019.02); *F02N 11/087* (2013.01);
(Continued)

(58) Field of Classification Search
CPC .......... B60L 50/66; B60L 53/62; B60L 58/20; B60L 2200/40; G06F 9/30003; F02N 11/0866
See application file for complete search history.

(56) References Cited

U.S. PATENT DOCUMENTS 6,325,035 B1 * 12/2001 Codina ............... F02N 11/0866
                                                    123/179.1
7,042,115 B2 * 5/2006 Mizutani ............. F02N 11/0814
                                                    307/10.1
(Continued)

FOREIGN PATENT DOCUMENTS

DE          60300513 T2     2/2006
DE        102015122694 A1   6/2016
(Continued)

OTHER PUBLICATIONS

Israeli Office Action for Israeli Application No. 263321 dated Jun. 25, 2020 with English translation.

*Primary Examiner* — Daniel J Cavallari
(74) *Attorney, Agent, or Firm* — Muncy, Geissler, Olds & Lowe, P.C.

(57) ABSTRACT

An apparatus for providing electrical energy in a vehicle, including a main energy store for storing electrical energy, an additional energy store, which can be switched over by the main energy store, a main switch for supplying the apparatus connection with a voltage provided by the main energy store, an additional switch for supplying the apparatus connection with a voltage provided by the additional energy store and a control device for switching the main switch and the additional switch over between a first switching state and a second switching state. In the first switching state, the apparatus connection is supplied with the voltage provided by the main energy store, while the additional energy store is disconnected from the apparatus connection. In the second switching state, is supplied with the voltage provided by the additional energy store, while the main energy store is disconnected from the apparatus connection.

15 Claims, 2 Drawing Sheets

(51) Int. Cl.
  *G06F 9/30*    (2018.01)
  *B60L 58/20*   (2019.01)
  *F02N 11/08*   (2006.01)

(52) U.S. Cl.
  CPC ...... *F02N 11/0866* (2013.01); *G06F 9/30003* (2013.01); *B60L 2200/40* (2013.01); *B60L 2210/10* (2013.01)

(56) References Cited

U.S. PATENT DOCUMENTS

| | | | |
|---|---|---|---|
| 9,610,845 | B2 | 4/2017 | Namuduri et al. |
| 9,868,410 | B2 * | 1/2018 | Namuduri ............. B60R 16/033 |
| 2009/0289497 | A1 | 11/2009 | Ichikawa et al. |
| 2014/0368041 | A1 | 12/2014 | Tu et al. |
| 2017/0030316 | A1 * | 2/2017 | Sekiguchi ........... F02N 11/0866 |
| 2017/0197567 | A1 * | 7/2017 | Iwasaki ............... F02N 11/0866 |
| 2019/0047539 | A1 * | 2/2019 | Kinoshita ............. F02D 41/123 |

FOREIGN PATENT DOCUMENTS

| | | |
|---|---|---|
| DE | 102016105452 A1 | 10/2016 |
| DE | 102015012944 A1 | 4/2017 |

\* cited by examiner

APPARATUS AND METHOD FOR PROVIDING ELECTRICAL ENERGY IN A VEHICLE

This nonprovisional application claims priority under 35 U.S.C. § 119(a) to German Patent Application No. 10 2017 221 135.0, which was filed in Germany on Nov. 27, 2017, and which is herein incorporated by reference.

BACKGROUND OF THE INVENTION

Field of the Invention

The present invention relates to an apparatus for providing electrical energy in a vehicle, to a corresponding method and to a corresponding computer program.

Description of the Background Art

Start/stop systems for reducing fuel consumption in stationary phases are known from automotive engineering. Power management functions are often used to ensure that important components such as the radio or navigation device are not influenced during starting. The solutions are usually restricted to a battery.

In construction machines, additional energy stores, which ensure that the construction machines can even be started with discharged batteries, are often installed. These additional energy stores are usually based on supercapacitors and can be recharged from the main batteries with the aid of a DC voltage converter. In this case, the starter is connected directly to the additional energy stores. The start therefore always takes place from the additional energy stores.

SUMMARY OF THE INVENTION

It is therefore an object of the present invention to provide an improved apparatus and an improved method for providing electrical energy in a vehicle.

An apparatus for providing electrical energy in a vehicle is presented, wherein the apparatus includes: a main energy store for storing electrical energy; an additional energy store for additionally storing electrical energy, which additional energy store can be switched over by the main energy store; an apparatus connection for connecting at least one electrical component to the apparatus; a main switch for supplying the apparatus connection with a voltage provided by the main energy store; an additional switch for supplying the apparatus connection with a voltage provided by the additional energy store; and a control device for switching the main switch and the additional switch over between a first switching state and a second switching state, wherein, in the first switching state, the apparatus connection is supplied with the voltage provided by the main energy store, while the additional energy store is disconnected from the apparatus connection, and, in the second switching state, is supplied with the voltage provided by the additional energy store, while the main energy store is disconnected from the apparatus connection.

The apparatus may be part of an on-board electrical system of the vehicle. A main energy store can be, for example, at least one main battery that can be charged by means of a generator of the vehicle, for instance in the form of one or more lead-acid rechargeable batteries or other electrochemical energy stores such as, for example, LiFePO$_4$. The main energy store may, for example, be connected together or able to be connected together from a plurality of individual batteries. An additional energy store can be understood as meaning, for example, at least one battery or at least one capacitor, for instance a supercapacitor. It is possible, for example by way of a switch, to switch over between an energy draw from the main energy store or an energy draw from the additional energy store. The main energy store and the additional energy store may have identical or different rated voltages. An electrical component can be understood as meaning, for example, at least one load or the generator of the vehicle. A main or additional switch can be understood as meaning an electrically actuatable component part for establishing or interrupting an electrically conductive connection, wherein the main or additional switch establishes the connection in a closed state and interrupts it in an open state. The main switch and the additional switch may be able to be actuated independently of one another. The main switch may be actuated either by the driver or the apparatus. The additional switch may be actuated by the apparatus. In this context, reference is made to the fact that the approach presented here relates specifically to vehicles that have only exactly one on-board electrical system. This means that an energy consumer can draw the energy via a separate interface, which may be supplied with electrical energy by a plurality of energy stores. No redundant cables are therefore required but instead a single electrical supply section is preferably present, by way of which the electrical load(s) can be supplied with electrical energy. This property distinguishes the approach presented here from alternative approaches from automotive engineering. In the present approach, all the loads, starter and generator are therefore (always) inextricably connected to one another at a grid.

A control device can be an electrical device that processes sensor signals and outputs control and/or data signals depending thereon. The control device may have an interface, which may have a hardware and/or software design. In the case of a hardware design, the interfaces may be, for example, part of what is known as a system ASIC, which contains a very wide variety of functions of the control device. However, it is also possible that the interfaces are separate, integrated circuits or are formed at least partly of discrete component parts. In the case of a software design, the interfaces may be software modules, which are present, for example, on a microcontroller in addition to other software modules.

The approach presented here is suitable, in particular, for application in the field of military vehicles. These are operated most of the time while stationary and have very powerful engines, which require very high battery currents during starting. In addition, military vehicles are equipped with numerous electrical components, which lead to a much higher current requirement than in the case of civilian vehicles. With conventional lead-acid batteries, such vehicles can operate for only up to two hours before the lead-acid batteries can no longer deliver the required starting current. This leads to the crew leaving the engines to continue to run in order to recharge the batteries in the idle state, which is associated with an accordingly great fuel consumption.

The approach presented here now makes it possible to retrofit a vehicle with an additional energy store in a simple manner so that the vehicle can be started either from the main energy store or from the additional energy store by way of appropriate switchover. In particular, military vehicles can thus be retrofitted very easily since it is hardly possible here to connect the starter directly to the additional energy store, since the starters, glow plugs and alternator are generally connected together at a line. As a result, the fuel consumption can be significantly reduced. In addition, power management functions in the vehicle can be omitted.

The control device may be designed to actuate the main switch and/or the additional switch using a start signal representing a starting of the vehicle and/or a stop signal representing a stopping of the vehicle. A start signal can be understood as meaning, for example, a signal representing a start demand of a driver. Analogously thereto, a stop signal can be understood as meaning a signal representing a stop demand of the driver. As a result, the apparatus can be realized with an automatic start/stop control system.

The apparatus may have a signal suppression unit, which is designed to output or forward a suppression signal, which is designed to suppress the starting of a vehicle engine by a driver in the case of a switchover of the main switch and/or of the additional switch between the first switching state and the second switching state. A signal suppression unit can be understood as meaning an electronic component part connected upstream of the control device. As a result, it is possible, on the one hand, to prevent influencing of the switchover process by starting the vehicle engine and it is possible, on the other hand, to prevent the vehicle engine from being able to be damaged by an abrupt energy isolation from an energy store due to a switchover of the main switch and/or the additional switch.

In addition, the apparatus may have a voltage converter, which is arranged between the main energy store and the additional energy store, for converting a voltage provided by the main energy store and/or a voltage provided by the additional energy store. The voltage converter may be, for example, a bidirectional DC voltage converter. The voltage converter may be designed, for example, to regulate an output voltage of the main energy store and/or of the additional energy store in variable fashion. Through this embodiment, it is possible, depending on the selection of the respective output voltage, to control whether the additional energy store is charged or discharged by way of the main energy store or else whether the main energy store is charged or discharged by way of the additional energy store.

In this case, the voltage converter may be connected or be able to be connected in parallel with the additional switch. As a result, the voltage converter can be integrated into the apparatus with a low level of wiring outlay. In this case, the voltage converter can be independent with respect to the additional switch. In the present execution, for example, two voltage converters are implemented, wherein one is provided for charging the main battery from the additional store. Said voltage converter should be potential-isolated; in this case, the main battery is connected to the apparatus by way of the voltage converter. The vehicle is supplied with power completely by additional stores. A further voltage converter, which ensures, for example, the charging of the additional store from the main battery, does not need to be potential-free.

The control device may be designed to switch the main switch and the additional switch to at least one further switching state in which the additional energy store is charged by the main energy store by way of the voltage converter, or, additionally, the main energy store is charged by the additional energy store by way of the voltage converter. As a result, through simple switchover of the main switch and the additional switch, charging of the additional or main energy store is made possible.

It is advantageous when the apparatus has at least one sensor for providing a sensor signal representing a state of charge of the main energy store and/or of the additional energy store. In this case, the control device may be designed to actuate the main switch and/or the additional switch using the sensor signal. The sensor signal may represent, for example, a measured voltage, a measured resistance, a measured current or a measurement value of another relevant characteristic variable of the main or additional energy store. Through this embodiment, the apparatus may be realized with a battery management system, by way of which the lifetime of the main and additional energy store can be increased and the energy consumption for charging the main and additional energy store can be reduced.

The main switch may be designed to connect an earth connection of the main energy store to earth. In addition or as an alternative, the additional switch may be designed to connect a supply voltage connection of the additional energy store to the apparatus connection. As a result, when the main switch is open, charging of the additional energy store by way of the main energy store is made possible.

It is advantageous when the main energy store and the additional energy store have the same rated voltage. As a result, the apparatus connection may be supplied in each case with the same rated voltage irrespective of the energy store used.

The approach presented here also provides a method for providing electrical energy using an apparatus in accordance with one of the above embodiments, wherein the method comprises: outputting an actuation signal for switching the main switch and the additional switch over between the first switching state and the second switching state.

This method may be implemented, for example, in software or hardware or in a mixed form composed of software and hardware, for example in a control device.

A computer program product or computer program having program code that can be stored on a machine-readable carrier or storage medium such as a semiconductor memory, a hard disk memory or an optical memory and is used to carry out, implement and/or actuate the steps of the method according to one of the embodiments described above, in particular when the program product or program is executed on a computer or an apparatus is also advantageous.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
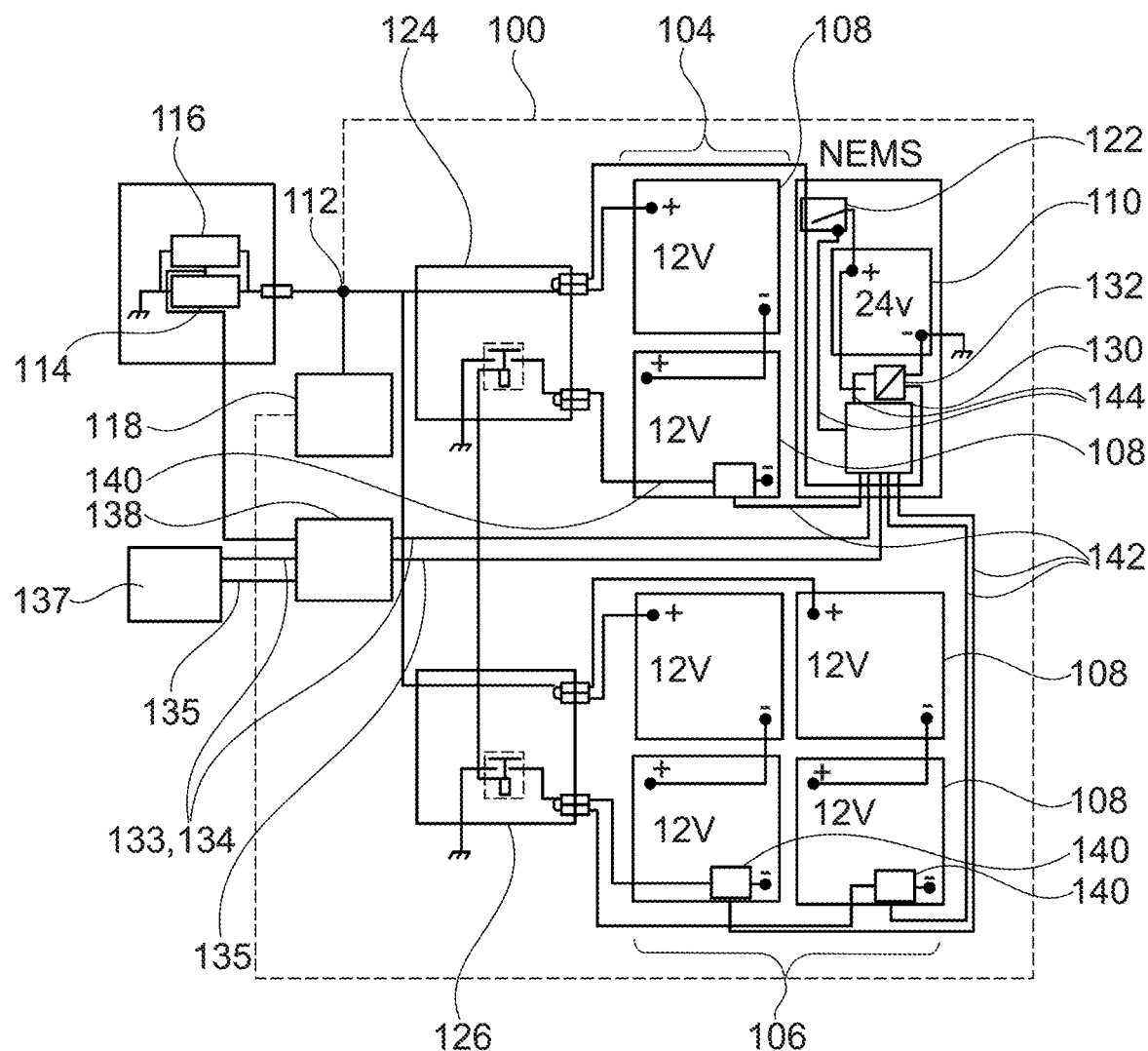
FIG. 1 shows a schematic illustration of an apparatus in accordance with an exemplary embodiment.

FIG. 1 shows a schematic illustration of an apparatus 100 in accordance with one exemplary embodiment. The apparatus 100 for providing electrical energy in a vehicle comprises, for example, a main energy store composed of a first main battery 104 and a second main battery 106 connected in parallel with the first main battery 104. The two main batteries 104, 106 each have a plurality of individual batteries 108 having a respective rated voltage of 12 V. By way of example, the first main battery 104 comprises two individual batteries 108 connected in series with one another, whereas the second main battery 106 comprises two pairs each composed of two individual batteries 108 connected in series with one another, which pairs are connected in parallel with one another. Furthermore, the apparatus 100 has an additional energy store 110 having an exemplary rated voltage of 26.4 V, as is the case, for example, in $LiFePO_4$ batteries. Additional batteries or the additional energy store 110 may have an identical rated voltage to or higher rated voltage than the main battery 104 or 106.

An apparatus connection 112 serves, for example, to connect a generator 114, a starter 116 or another load 118 to the apparatus 100. The main energy store and the additional energy store 110 are each able to be electrically conductively connected to the apparatus connection 112. By way of example, the main batteries 104, 106 and the additional energy store 110 are connected to the apparatus connection 112 by means of their positive pole functioning in each case as a supply voltage connection.

To interconnect the apparatus connection 112 with the main energy store or the additional energy store 110, the apparatus 100 has a main switch associated with the main energy store and an additional switch 122 associated with the additional energy store 110. In accordance with this exemplary embodiment, the main switch comprises a first relay 124 associated with the first main battery 104 and a second relay 126 associated with the second main battery 106. In this case, the first relay 124 is designed to connect a negative pole of the first main battery 104 to earth, which negative pole functions as an earth connection, and the second relay 126 is designed to connect a negative pole of the second main battery 106 to earth, which negative pole functions as an earth connection. The additional switch 122 is arranged in a line that connects the positive pole of the additional energy store 110 to the apparatus connection 112. FIG. 1 shows the relays 124, 126 and the additional switch 122 in the open state.

A control device 130 serves to actuate the main switch in the form of the two relays 124, 126 and the additional switch 122, which control device is designed to switch the main and additional switches over between a first switching state and a second switching state. In the first switching state, the main and additional switches are switched so that the apparatus connection 112 is supplied only with a voltage provided by the main energy store, while the additional energy store 110 is disconnected from the apparatus connection 112. Analogously thereto, in the second switching state, the main and additional switches are switched so that the apparatus connection 112 is supplied only with a voltage provided by the additional energy store 110, while conversely the main energy store, that is to say the two main batteries 104, 106, is disconnected from the apparatus connection 112. Therefore, in the first switching state, for example, at least one of the two relays 124, 126 is closed, while the additional switch 122 is open. Accordingly, in the second switching state, the additional switch 122 is closed, while the two relays 124, 126 are open.

In accordance with an exemplary embodiment, a DC voltage converter 132 is connected between the main energy store and the additional energy store 110. The DC voltage converter 132 is connected in parallel with the additional switch 122 and can be actuated by means of the control device 130. Charging of the additional energy store 110 by way of at least one of the two batteries 104, 106 or conversely charging of at least one of the two main batteries 104, 106 by way of the additional energy store 110 is possible by means of the DC voltage converter 132. To charge the additional energy store 110 or the main batteries 104, 106, the control device 130 switches the relays 124, 126 and the additional switch 122 over to corresponding switching states. For example, in a third switching state, the additional switch 122 is open so that a charging current can flow via the DC voltage converter 132.

In accordance with a further exemplary embodiment, the control device 130 is designed to actuate the relays 124, 126 and the additional switch 122 using a start signal 133, which represents a starting of the vehicle, or else a stop signal 134, which represents a stopping of the vehicle. For this purpose, the control device 130 can actuate the relays 124 and 126 specifically in the case of starting and stopping of the vehicle engine, for example, so that, specifically for the starting, a sufficiently large amount of energy is available for the start of the vehicle engine.

In accordance with a further exemplary embodiment, the control device 130 can also be designed, during switchover of the relays 124, 126 and of the additional switch 122, to output a suppression signal 135, which represents a currently occurring switchover of the main switch (specifically at least one of the relays 124 or 126) and of the additional switch 122 between a first switching state and a second switching state, in order to ensure that a driver 137 cannot start the vehicle at this moment. To this end, an optional signal suppression unit 138, also referred to as a signal disconnection box, is connected downstream of the control device 130, which signal suppression unit forwards the suppression signal 135 to the driver 137 (or outputs it to the driver 137), which suppression signal is designed to suppress the starting of the vehicle engine by the driver 137 during the switchover between two switching states. To this end, the apparatus 100 can be designed to be able to sense a start demand of the driver 137. As an alternative or in addition, a corresponding signal, which represents the start demand of the driver, can be sensed by a unit outside of the apparatus 100. If the apparatus 100 determines that the energy store (in this case, for example, the main energy store composed of a first main battery 104 and a second main battery 106 connected in parallel with the first main battery 104) is no longer capable of starting the vehicle, the possible start instruction of the driver is suppressed by activation of a corresponding module of the control device 130 or of the signal suppression unit 138 by means of the suppression signal 135. If a start demand of a driver 137 is present, the switch state is switched to the additional energy store 110 and the signal suppression unit 138 is either deactivated or the starter is activated past the driver 137.

To realize a battery management system, the apparatus 100 in accordance with the exemplary embodiment shown in FIG. 1 comprises a total of three battery management system sensors 140 for providing a sensor signal 142 representing a state of charge of the main energy store, which sensor signal can be evaluated by means of the control device 130 and is used by said control device to generate an actuation signal 144 to actuate the main and additional switch or the DC voltage converter 132.

As shown by way of example in FIG. 1, the additional switch 122, the additional energy store 110, the control device 130 and the DC voltage converter 132 may be integrated in an installation space of, for example, two lead-acid batteries or corresponding electrochemical energy stores.

For example, the apparatus 100 provides the advantage that each present military vehicle can be easily retrofitted with the additional energy store 110. As a result, the starting ability can be ensured at any time. The voltage level and the chemistry of the main and additional energy store can be selected freely. The control device 130 switches over between the main and additional energy store so that the entire vehicle is always supplied with power either by at least one of the main batteries 104, 106 or the additional energy store 110.

To avoid short interruptions during switchover, the apparatus 100 has, for example, an additional power resistor including switch. For example, a vehicle-based main relay and/or the two vehicle-based main relays 126 and 124 can be used for switchover.

The additional energy store 110 is recharged from the main energy store by way of the DC voltage converter 132. The generator 114 installed in the engine is used only for recharging the main energy store on account of the different voltage level between the main and additional energy stores. Given an identical voltage level of the main battery and the additional battery, the additional battery can also be recharged. If the installed generator provides an adjustable charging characteristic curve, the control device 130 can execute switchover to a characteristic curve matched to the used battery chemistry of the additional store.

The main energy store is recharged, for example, from the additional energy store 110 by way of an additional DC voltage converter. This is expedient when the main energy store is so far discharged that the vehicle can no longer be switched on by means of the main energy store. The DC voltage converter serves to raise the voltage of the main energy store back to a level at which all of the components in the vehicle function. If this is the case, there is a switchover to the main energy store, which is then charged by the generator 114.

In order that the switchover is not disturbed, it should be ensured that the driver does not start the vehicle at this moment. The signal suppression unit 138, which suppresses the demands of the driver (such as the starting of the vehicle engine) during switchover of the main switch 124 and 126 and/or of the additional switch 122 between a first switching state and a second switching state, serves for this purpose. In accordance with one exemplary embodiment, the signal suppression unit 138 is constructed so that a failure of the HEMS does not have an influence on the vehicle behaviour. The driver can also start the vehicle without HEMS with the aid of the main energy store.

The HEMS is designed, for example, to identify a necessary start or a start demand of the driver and to switchover automatically to the best suited energy store for the start depending thereon. An automatic start/stop functionality is thus possible.

The control device 130 obtains the information about the main energy store in the form of the sensor signal 142 from the respective battery management system sensors 140 of the main batteries 104, 106.

In accordance with one exemplary embodiment, the apparatus 100 is constructed so that a failure of the HEMS leads to a secure state in which the vehicle is operated automatically by the main energy store. The availability of the vehicle is increased as a result.

In accordance with a particularly advantageous exemplary embodiment, the apparatus 100 comprises the following components: main and additional energy store, battery management system, control device, relays, charging resistor and DC voltage converter; a signal disconnection box; and/or a battery sensors for the main energy store.

Figure 2:
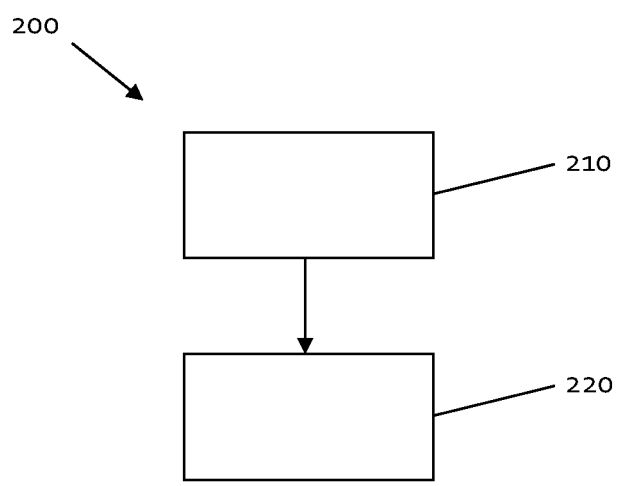
FIG. 2 shows a flow chart of a method in accordance with an exemplary embodiment.

FIG. 2 shows a flow chart of a method 200 in accordance with one exemplary embodiment. The method 200 for providing electrical energy in a vehicle may be executed, for example, by means of the control device described above based on FIG. 1. In this case, the sensor signal of the battery sensors is received in an optional step 210. In a further step 220, the actuation signal for accordingly actuating the main and additional switch between the various switching states is provided using the sensor signal.

The exemplary embodiments described and shown in the figures are selected purely by way of example. Different exemplary embodiments may be combined with one another in full or in relation to individual features. It is also possible to supplement one exemplary embodiment with features of a further exemplary embodiment.

Furthermore, it is possible for method steps according to the invention to be repeated and to be carried out in a different sequence to that described.

If one exemplary embodiment comprises an "and/or" conjunction between a first feature and a second feature, this can be read as meaning that the exemplary embodiment, in accordance with one embodiment, has both the first feature and the second feature and, in accordance with a further embodiment, has either only the first feature or only the second feature.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for providing electrical energy in a vehicle, the apparatus comprising:
   a main energy store for storing electrical energy;
   an additional energy store for additionally storing electrical energy;
   an apparatus connection for connecting at least one electrical component to the apparatus;
   a main switch relaying a voltage provided by the main energy store to the apparatus connection;
   an additional switch relaying a voltage provided by the additional energy store through the main switch to the apparatus connection; and
   a control device for switching the main switch and the additional switch between a first switching state and a second switching state,
   wherein, in the first switching state, the apparatus connection is supplied with the voltage provided by the main energy store, and not the voltage from the additional energy store,
   wherein, in the second switching state, the apparatus connection is supplied with the voltage provided by the additional energy store, and not the voltage from the main energy store, and
   wherein the additional switch connects a supply voltage connection of the additional energy store to the apparatus connection via at least one relay of the main switch, the additional energy store being chargeable from the main enemy store.

2. The apparatus according to claim 1, wherein the control device is configured to actuate the main switch and/or the additional switch using a start signal representing a starting of the vehicle and/or a stop signal representing a stopping of the vehicle.

3. An apparatus for providing electrical enemy in a vehicle, the apparatus comprising:
a main enemy store for storing electrical enemy;
an additional energy store for additionally storing electrical energy;
an apparatus connection for connecting at least one electrical component to the apparatus;
a main switch relaying a voltage provided by the main energy store to the apparatus connection;
an additional switch relaying a voltage provided by the additional enemy store through the main switch to the apparatus connection;
a signal suppression unit configured to output or forward a suppression signal, which is designed, in the case of a switchover of the main switch and/or of the additional switch between the first switching state and the second switching state, to suppress a starting of a vehicle engine by a driver; and
a control device for switching the main switch and the additional switch between a first switching state and a second switching state,
wherein, in the first switching state, the apparatus connection is supplied with the voltage provided by the main energy store, and not the voltage from the additional energy store,
wherein, in the second switching state, the apparatus connection is supplied with the voltage provided by the additional energy store, and not the voltage from the main energy store, and
wherein the control device is configured to actuate the main switch and/or the additional switch using a start signal representing the starting of the vehicle and/or a stop signal representing a stopping of the vehicle.

4. The apparatus according to claim 1, further comprising a voltage converter, which is arranged or connected between the main energy store and the additional energy store, for converting a voltage provided by the main energy store and/or a voltage provided by the additional energy store.

5. An apparatus for providing electrical energy in a vehicle, the apparatus comprising:
a main energy store for storing electrical energy;
an additional energy store for additionally storing electrical energy;
a voltage converter, which is arranged or connected between the main energy store and the additional energy store, for converting a voltage provided by the main energy store and/or a voltage provided by the additional energy store;
an apparatus connection for connecting at least one electrical component to the apparatus;
a main switch relaying a voltage provided by the main energy store to the apparatus connection;
an additional switch relaying a voltage provided by the additional energy store through the main switch to the apparatus connection; and
a control device for switching the main switch and the additional switch between a first switching state and a second switching state,
wherein, in the first switching state, the apparatus connection is supplied with the voltage provided by the main energy store, and not the voltage from the additional energy store,
wherein, in the second switching state, the apparatus connection is supplied with the voltage provided by the additional energy store, and not the voltage from the main energy store, and
wherein the voltage converter is connected or connectable in parallel with the additional switch.

6. An apparatus for providing electrical energy in a vehicle, the apparatus comprising:
a main energy store for storing electrical energy;
an additional energy store for additionally storing electrical energy;
a voltage converter, which is arranged or connected between the main energy store and the additional energy store, for converting a voltage provided by the main energy store and/or a voltage provided by the additional energy store;
an apparatus connection for connecting at least one electrical component to the apparatus;
a main switch relaying a voltage provided by the main energy store to the apparatus connection;
an additional switch relaying a voltage provided by the additional energy store through the main switch to the apparatus connection; and
a control device for switching the main switch and the additional switch between a first switching state and a second switching state,
wherein, in the first switching state, the apparatus connection is supplied with the voltage provided by the main energy store, and not the voltage from the additional energy store,
wherein, in the second switching state, the apparatus connection is supplied with the voltage provided by the additional energy store, and not the voltage from the main energy store, and
wherein the control device switches the main switch and the additional switch to at least one further switching state in which the additional energy store is charged by the main energy store via the voltage converter.

7. The apparatus according to claim 1, further comprising at least one sensor for providing a sensor signal representing a state of charge of the main energy store and/or of the additional energy store, wherein the control device actuates the main switch and/or the additional switch using the sensor signal.

8. The apparatus according to claim 1, wherein the main switch connects an earth connection of the main energy store to earth and/or the additional switch connects the supply voltage connection of the additional energy store to the apparatus connection.

9. A method for providing electrical energy, the method comprising:
providing an apparatus according to claim 1; and
outputting an actuation signal for switching the main switch and the additional switch over between the first switching state and the second switching state.

10. A computer program, which is designed to execute and/or actuate the method according to claim 9.

11. A machine-readable storage medium, on which the computer program according to claim 10 is stored.

12. The apparatus according to claim 1, wherein the main switch connects an earth connection of the main energy store to earth, and in the second switching state the main switch disconnects the earth connection.

13. The apparatus according to claim 1, the main switch comprising: a first relay and a second relay, the first relay connecting to a first bank of energy storage and the second relay connecting to a second bank of energy storage.

14. An apparatus for providing electrical energy in a vehicle, the apparatus comprising:
a main energy store for storing electrical energy;
an additional energy store for additionally storing electrical energy,
an apparatus connection for connecting at least one electrical component to the apparatus;
a main switch circuit comprising a main switch and pass-through connection for selectively supplying the apparatus connection with a voltage provided by the main energy store;
and the additional energy store;
an additional switch for supplying the apparatus connection via said switch circuit with a voltage provided by the additional energy store; and
a control device for switching the main switch and the additional switch over between a first switching state and a second switching state,
wherein, in the first switching state, the apparatus connection is supplied with the voltage provided by the main energy store by connecting a negative terminal pole of the main energy store to earth, while the additional energy store is disconnected from the apparatus connection, and,
wherein, in the second switching state, the apparatus connection is supplied with the voltage provided by the additional energy store, while the main energy store negative terminal pole is disconnected from earth for stopping provision of power from the main energy store to the apparatus connection.

15. An apparatus for providing electrical energy in a vehicle, the apparatus comprising:
a main energy store for storing electrical energy;
an additional energy store for additionally storing electrical energy;
an apparatus connection for connecting at least one electrical component to the apparatus;
a main switch connected to the apparatus connection and relaying a voltage provided by the main energy store;
an additional switch connected to the apparatus connection and relaying a voltage provided by the additional energy store through the main switch; and
a control device for switching the main switch and the additional switch between a first switching state and a second switching state,
wherein, in the first switching state, the apparatus connection is supplied with the voltage provided by the main energy store, and the additional energy store is disconnected from earth, and,
wherein, in the second switching state, the apparatus connection is supplied with the voltage provided by the additional energy store, and the main energy store is disconnected from earth.

* * * * *